United States Patent
Chun et al.

(10) Patent No.: US 9,053,150 B2
(45) Date of Patent: Jun. 9, 2015

(54) PSM COMPILER OPTIMIZER AND METHOD FOR PROCESSING BULK DML

(71) Applicant: TIBERO Co., Ltd., Gyeonggi-do (KR)

(72) Inventors: Posung Chun, Gyeonggi-do (KR); Sang Young Park, Gyeonggi-do (KR); Joohyun Lee, Gyeonggi-do (KR); Youngjae Choi, Gyeonggi-do (KR); Kyungtae Lee, Gyeonggi-do (KR)

(73) Assignee: TIBERO CO., LTD., Gyeonggi-Do ( * ) Notice: Subject to any disclaimer, the term of this patent is extended or adjusted under 35 U.S.C. 154(b) by 187 days.

(21) Appl. No.: 13/949,524

(22) Filed: Jul. 24, 2013

(65) Prior Publication Data
US 2014/0297619 A1 Oct. 2, 2014

(30) Foreign Application Priority Data
Mar. 27, 2013 (KR) .................. 10-2013-0032825

(51) Int. Cl.
*G06F 17/30* (2006.01)

(52) U.S. Cl.
CPC .............................. *G06F 17/30471* (2013.01)

(58) Field of Classification Search
CPC ....................................................... G06F 17/30
USPC ................................................ 707/600–899
See application file for complete search history.

(56) References Cited

U.S. PATENT DOCUMENTS

2009/0019029 A1* 1/2009 Tommaney et al. .............. 707/5

FOREIGN PATENT DOCUMENTS

KR    10-2000-0056629    9/2000

* cited by examiner

*Primary Examiner* — Isaac M Woo
(74) *Attorney, Agent, or Firm* — Bacon & Thomas, PLLC

(57) ABSTRACT

A PSM complier optimizer analyzes a pattern of the PSM program to generate instruction codes, which will be subjected to a bulk operation and makes the instruction codes for the bulk operation in a form of an array of bind parameters to perform a bulk cursor. Accordingly, the bulk DML processing improves the performance of the PSM program.

7 Claims, 7 Drawing Sheets

PSM COMPILER OPTIMIZER AND METHOD FOR PROCESSING BULK DML

RELATED APPLICATION(S)

This application claims the benefit of Korean Patent Application No. 10-2013-0032825, filed on 27 Mar., 2013 which is hereby incorporated by reference as if fully set forth herein.

FIELD OF THE INVENTION

The present invention relates to a PSM (Persistent Stored Model) compiler, and more particularly, to a PSM compiler optimizer and method for processing bulk DML (Data Manipulation Language), which enables a bulk-DML processing in such a manner that analyzes the pattern of a PSM program written in a PSM to create instruction codes, which will be subjected to a bulk operation, and makes the instruction codes for the bulk operation in a form of an array of bind parameters to operate a bulk cursor, thereby improving the performance of the PSM program.

This work was supported by the Ministry of Knowledge Economy in Korea under Project 10040937 [Source Technology Development Business For Industrial Convergence].

BACKGROUND OF THE INVENTION

In general, a RDBMS (Relational Database Management System) performs a bulk operation on bulk data. The bulk operation creates a bulk parameter in a form of an array in each DML so that a procedure of double interpretation of the DML can be eliminated. In addition, since the bulk operation changes only the data to be processed, the processing speed may be enhanced.

However, for the bulk operation, the developer of the PSM program needs to explicitly write the bulk parameters.

Figure 1:
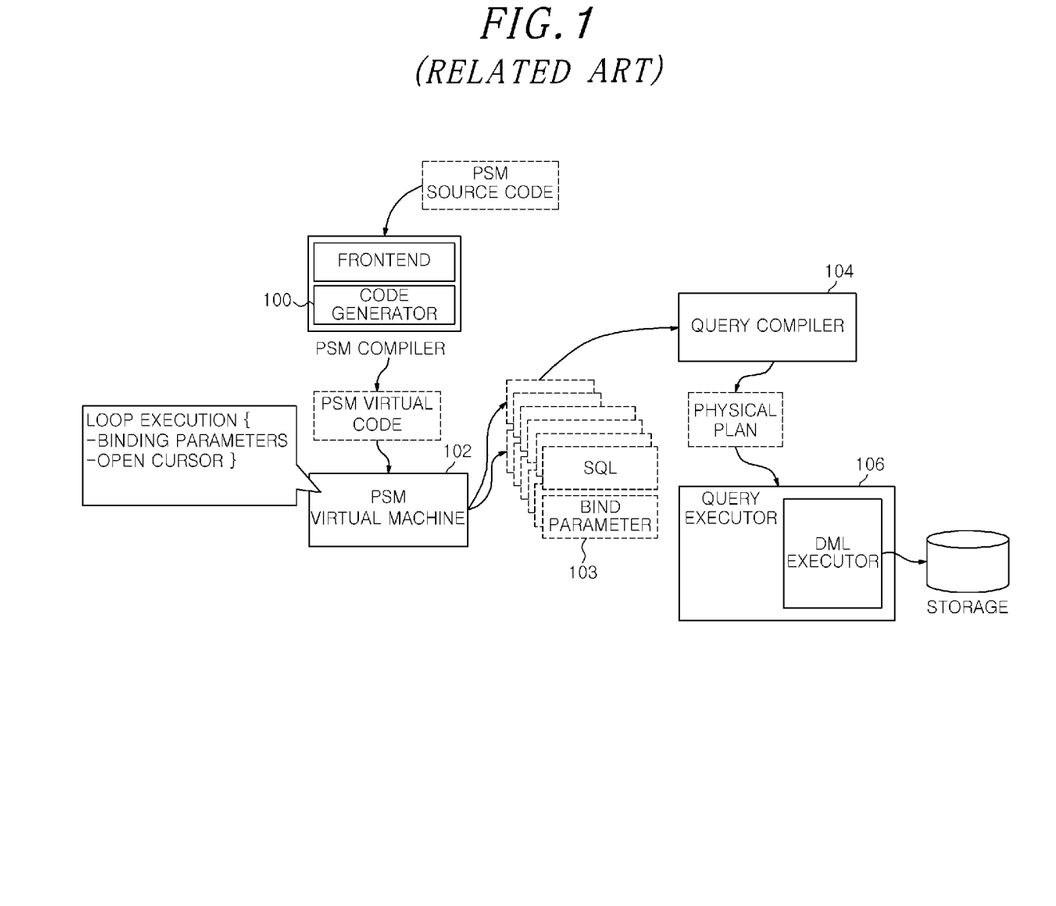
FIG. 1 is a conceptional diagram illustrating a code conversion operation performed in a PSM compiler in accordance with a related art.

FIG. 1 illustrates a concept of a code conversion operation in a PSM compiler in accordance with a related art.

Referring to FIG. 1, when PSM source codes are provided to the PSM compiler via a frontend, PSM virtual codes are generated by a code generator 100 and the generated PSM virtual codes are converted by a PSM virtual machine 102 into bind parameters 103, to thereby produce a SQL (Structured Query Language) document. The generated bind parameters 103 are sent to a query compiler 104 for a DML conversion and in turn a query executor 106, and then are processed in a sequential order.

In the PSM compiler, however, one bind parameter to be processed is converted into one DML, and hence a SQL parsing overhead may increase. Further, it is difficult to expect the improvement of performance of the PSM compiler due to the conversion into a single DML.

SUMMARY OF THE INVENTION

In view of the above, the present invention provides a PSM compiler optimizer and method for processing a bulk DML, which enables a bulk-DML processing in such a manner that analyzes the pattern of the PSM program written in a PSM to create instruction codes, which will be subjected to a bulk operation, and makes the instruction codes for the bulk operation in a form of an array of bind parameters to operate a bulk cursor, thereby improving the performance of the PSM program.

In accordance with an aspect of the present invention, there is provided a PSM compiler optimizer, which includes: a code generator configured to analyze the pattern of a PSM program to pick out instruction codes that will be subjected to a bulk operation from the PSM program and produce codes for the bulk operation with respect to the instruction codes that will be subjected to the bulk operation; a virtual machine configured to interpret the bulk operation codes to produce DMLs depending on the bulk operation; a query executor configured to process the DMLs produced by the virtual machine, wherein the virtual machine is configured to maintain the DMLs stored in a memory if the number of the DMLs is less than or equal to a predetermined value and forward the DMLs stored in the memory to the query executor when the number of the DMLs reaches the predetermined value, and the query executor is configured to batch-process the DMLs forwarded from the virtual machine.

In the embodiment, when a DML statement and other statement different from the DML statement are mixed in the bulk operation codes, the virtual machine is configured to add TCL (Transaction Control Language) information to the bind parameters included in the other statements so that the query executor identifies that the DML statement and the other statement different from the DML statement are mixed in the bulk operation codes.

In the embodiment, the query executor is configured to check whether the DML statement and the other statement different from the DML statement are mixed in the bulk operation codes using the TCL information and perform a procedure adapted for the other statement different from the DML statement when the other statement is mixed with the DML statement in the bulk operation codes.

In accordance with another aspect of the present invention, there is provided a method for processing a bulk-DML, which includes: analyzing, in a PSM optimizer, the pattern of a PSM program to pick out instruction codes that will be subjected to a bulk operation from the PSM program; producing, in a virtual machine, bulk operation codes with respect to the instruction codes that will be subjected to the bulk operation; interpreting, in the virtual machine, the bulk operation codes to produce DMLs depending on the bulk operation; forwarding, in the virtual machine, the DMLs to a query executor when the number of the DMLs reaches a predetermined value; and performing a batch-process on the DMLs forwarded from the virtual machine.

In the embodiment, the forwarding the DMLs to the query executor includes: counting the number of the DMLs produced by the virtual machine; storing the DMLs in a memory when the number of the DMLs is less than or equal to the predetermined value; forwarding the DMLs stored in the memory to the query executor when the number of the DMLs reaches the predetermined value.

In the embodiment, the performing the batch-process on the DMLs includes: checking whether a DML statement and other statement different from the DML statement are mixed in the DMLs produced by the virtual machine; batch-processing the DMLs when there exists only the DML statements; and performing a procedure adapted for the other statement different from the DML statement when the other statement is mixed with the DML statement.

In the embodiment, the checking whether a DML statement and other statement different from the DML statement are mixed in the DMLs includes identifying whether the TCL information exists in the DML statement to check whether the other statement is mixed with the DML statement in the DMLs.

As described above, the exemplary embodiment of the present invention performs a bulk-DML processing in such a manner that the pattern of the PSM program written in a PSM is analyzed to generate an instruction code, which will be subjected to a bulk operation, and the instruction codes for the bulk operation are made in a form of an array of bind parameters to operate a bulk cursor, which results in improving the performance of the PSM program.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereafter, the principles of operation of the present invention will be described in detail with reference to the accompanying drawings. In describing the embodiments of the invention, known function or configuration will not be described fully if the detailed description thereof makes the scope and spirit of the invention ambiguous. The following terms are defined in consideration of functions in the embodiments of the invention and may vary in accordance with intentions of a user or an operator or according to usual practice. Therefore, the definitions of the terms should be interpreted on the basis of the entire content of the specification.

Figure 2:
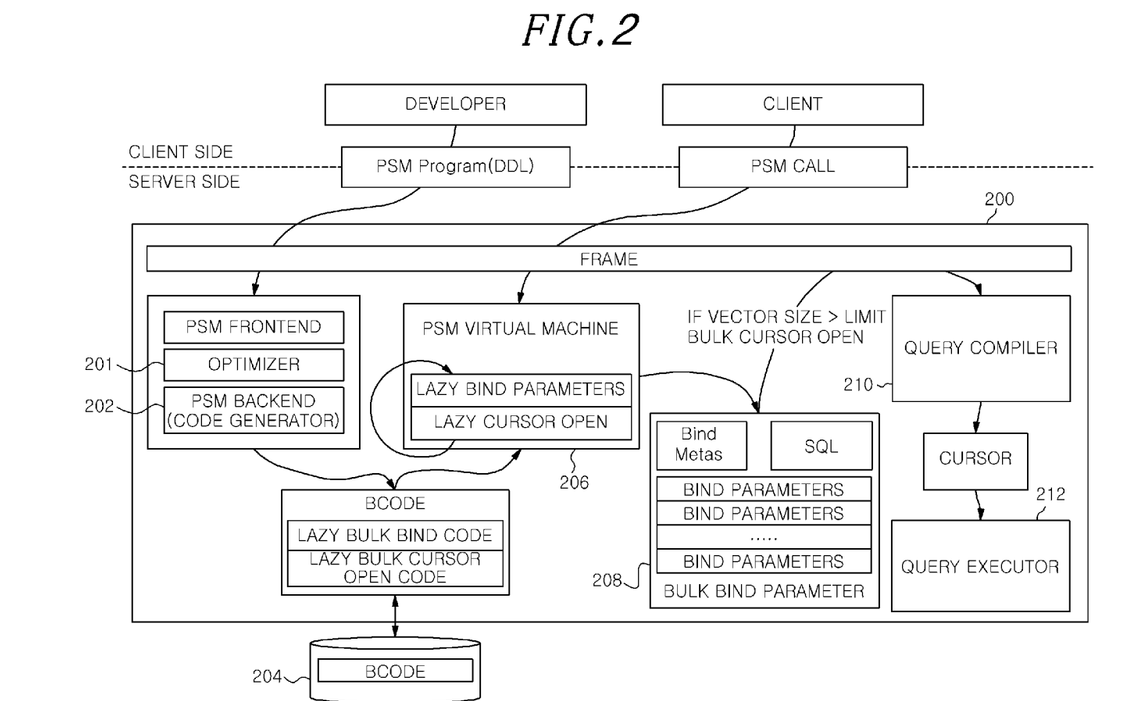
FIG. 2 shows a schematic block diagram of a PSM compiler optimizer in accordance with an exemplary embodiment of the present invention.

FIG. 2 shows a schematic block diagram of a PSM compiler optimizer in accordance with an exemplary embodiment of the present invention. A PSM compiler optimizer 200 of the exemplary embodiment includes an optimizer 201, a code generator 202, a code storage 204, a PSM virtual machine 206, a bind parameter storage 208, a query compiler 210, and a query executor 212.

The code generator 202 analyzes a pattern of a PSM program to picks out instruction codes that will be subjected to a bulk operation from the PSM program.

More specifically, the code generator 202 picks out code patterns having an optimization possibility for data access from an intermediate representation phase of the PSM program to determine them as patterns that will be subjected to the bulk operation. Further, the code generator 202 generates instruction codes for the bulk operation (BCODEs) with respect to the picked out instruction codes. The bulk operation codes are stored in the code storage 204.

The PSM virtual machine 206 interprets the bulk operation codes to produce DMLs (Data Manipulation Language). Further, the PSM virtual machine 206 counts the number of DMLs to check whether the number of DMLs reaches a predetermined value, maintains the DMLs stored in the bind parameter storage 208 without passing them to the query compiler 210 if the number of the DMLs is less than or equal to the predetermined value and forwards the DMLs stored in the bind parameter storage 208 to the query compiler 210 and the query executor 212 if the number of the DMLs reaches the predetermined value.

The query executor 212 batch-processes the DMLs in bulk sent from the virtual machine 206. Further, the query executor 212 identifies a type of bind parameters in an array of bind parameters using TCL information. If other statement such as a statement written in a PSM, which is different from a statement written in a DML, is identified, the query executor 212 performs a suitable operation for the identified statement.

Figure 3:
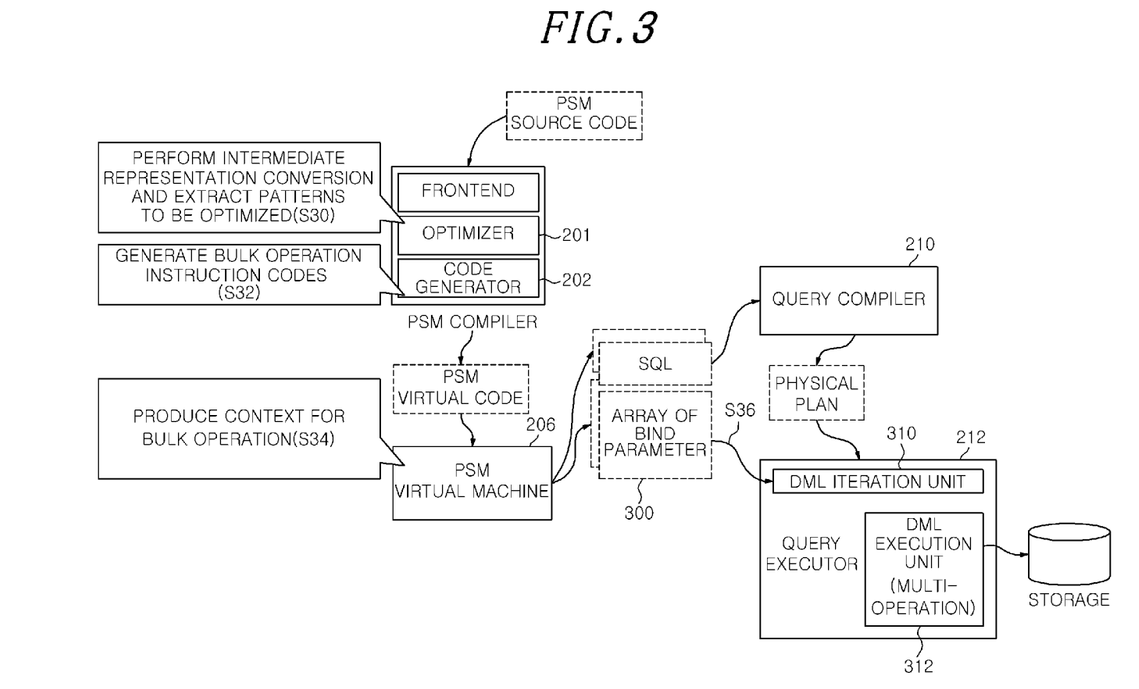
FIG. 3 is a flow diagram explaining a process of a bulk operation performed in a PSM compiler optimizer in accordance with an exemplary embodiment of the present invention.

FIG. 3 is a flow diagram illustrating a process of a bulk operation performed in the PSM compiler optimizer in accordance with an exemplary embodiment of the present invention. The exemplary embodiment of the present invention will be described in detail with reference to FIGS. 2 and 3.

First, when PSM source codes are provided to the PSM compiler optimizer 200, the optimizer 201 performs the conversion into the intermediate representation phase of the PSM program on the PSM source code and picks out the code patterns to be optimized, in operation S30.

The code generator 202 then generates the instruction codes that will be subjected to the bulk operation using the code patterns for data access picked out from the optimizer 201, in operation S32.

In other words, the code generator 202 analyzes the code patterns of the PSM program to pick out the instruction codes from the PSM program that will be subjected to the bulk operation and generates the instruction codes for the bulk operation with respect to the instruction codes that will be subjected to the bulk operation.

The bulk operation codes are then provided to the PSM virtual machine 206. The PSM virtual machine 206 performs a lazy bulk operation instruction on the bulk operation codes to produce bulk context to be subjected to the bulk operation, in operation S34.

During this operation, the PSM virtual machine 206 makes the bulk operation codes in the form of an array of bind parameters 300 and performs its process in such a way of operating the bulk cursor.

Further, the PSM virtual machine 206 interprets the bulk operation codes to yield DMLs depending on the bulk operation. The PSM virtual machine 206 then maintains the DMLs stored in a memory without passing the DMLs to the query executor 212 until the number of the DMLs reaches a predetermined threshold. The PSM virtual machine 206 forwards the DMLs to the query executor 212 when the number of the DMLs reaches the predetermined threshold, in operation S36.

In other words, in accordance with an exemplary embodiment of the present invention, even when an instruction for the lazy bulk operation is produced by the PSM virtual machine, the DMLs are not sent to the query executor 212 while being remained in the memory until the number of DMLs reaches the predetermined threshold. When the number of DMLs reaches the threshold, the DMLs is forwarded to the query executor 212 and are processed in the bulk operation. In this case, the array of bind parameters 300 in the form of an array is laid in the DML statement.

Therefore, without changing the PSM program, the same processing can be performed in the bulk operation as that multiple bind parameters in the form of an array are processed for each DML, which enables the performance improvement of the PSM program.

Thus, it is not until the number of the DMLs reaches the threshold that the query executor 212 receives the N number of DMLs forwarded from the PSM virtual machine 206 and batch-processes them. Accordingly, it is possible for the PSM compiler optimizer to process the DMLs in bulk without changing the PSM program, which results in improving the performance of the PSM program.

The query executor 212 includes a DML iteration unit 310 and a DML execution unit 312. The DML iteration unit 310 sets a following bind parameter for the DML processing and the DML execution unit 312 batch-processes the N number of DMLs forwarded from the PSM virtual machine 206.

In other words, unlike the conventional art, the PSM compiler optimizer of the exemplary embodiment of the present invention is designed to set an array of the bind parameters per one DML statement while changing only the data. Accordingly it is possible to prevent the repetitive interpretation of the DML and improve the performance of the PSM program. Further, the PSM compiler optimizer may help the developer create the PSM program in an application where the DMLs appear frequently.

Figure 4:
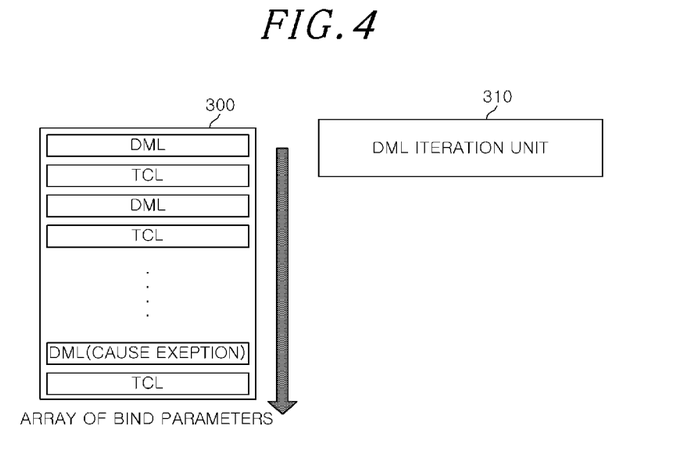
FIG. 4 is a conceptional diagram illustrating a procedure of an exception handling to secure program semantic when there is an exception occurrence in accordance with an exemplary embodiment of the present invention.

FIG. 4 shows a concept of conducting an exception handling to secure a program semantic in accordance with an exemplary embodiment of the present invention.

As can be seen from FIG. 4, statements written in a DML and other kind of statements such as statements written in a PSM in a program code, which is forwarded from the PSM virtual machine 206 to the query executor 212. The virtual machine 206 adds TCL information to the bind parameters of the PSM statements so that the query executor 212 copes with the program codes depending on the type of the statements.

The DML iteration unit 310 in the query executor 212 identifies the type of the bind parameters in the array of the bind parameters based on the TCL information, and the DML execution unit 312 executes a procedure adapted for the PSM statements when receiving the program code having the PSM statements instead of the DML statements.

Therefore, as compared to the related art that has a complicated error handling during the bulk operation, the exemplary embodiment of the present invention does not loss the meaning of the statements of the PSM program caused by the exception occurrence by adding the TCL information to the bind parameters while preserving the meaning of the statements before the optimization for the bulk operation, which results in facilitating the exception handling and guaranteeing the semantic such as Commit, Rollback and the like.

Further, the optimizer 201 for the PSM compiler may be used in conjunction with other compiler optimizations or repetitively perform the compiler optimization in order to achieve the optimization. Prior to the exemplary optimization of the present invention, more patterns to be optimized may be pulled out through a loop fission process and a function/procedure in-lining process. Moreover, even though the PSM statements as well as DML statements are included in a loop, the optimization can be done as set forth above, so more opportunities for optimization can be get.

In addition, the bulk operations converted as in the exemplary embodiment may include the multi-DML functionality, which leads to the decrease in a cost for data block locking, a cost for Redo/Undo Logging and an algorithm cost taken to look for Free space, and hence enables the production of codes with highly improved performance.

Figure 5:
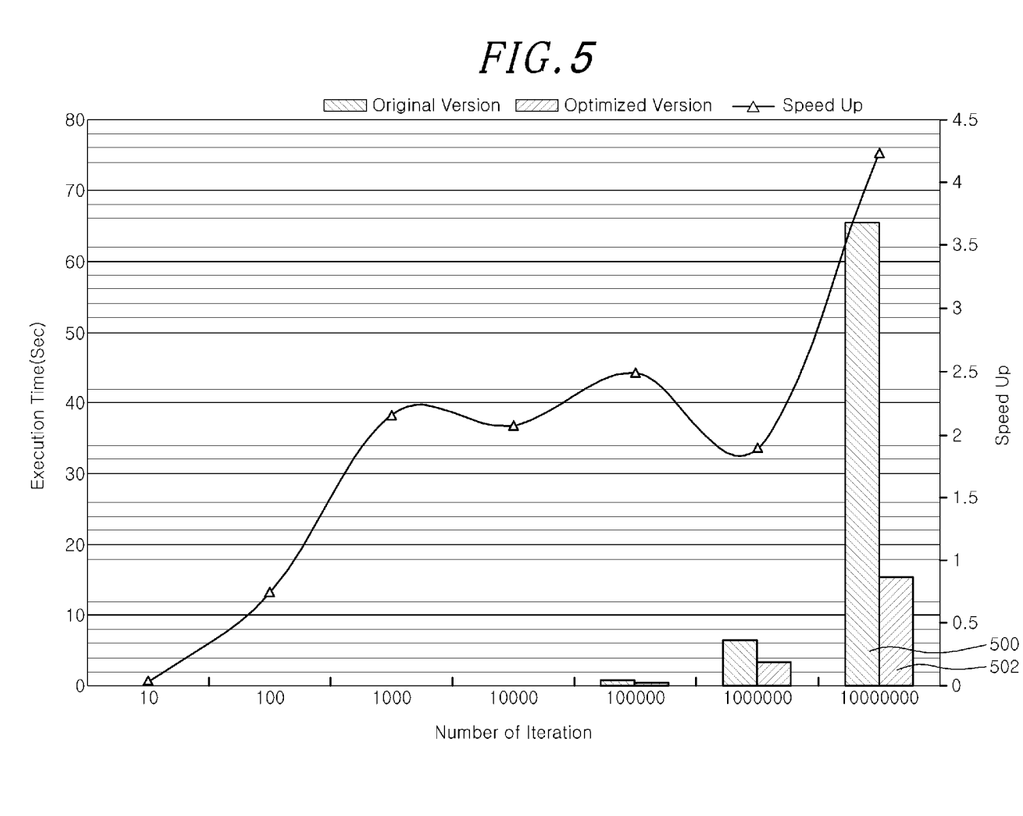
FIG. 5 is a graph exhibiting the optimized performance of a PSM compiler optimizer in accordance with an exemplary embodiment of the present invention.

FIG. 5 is a graph exhibiting the optimized performance of a PSM compiler optimizer in accordance with an exemplary embodiment of the present invention;

In other words, FIG. 5 illustrates the result of automatic performance optimization applied to the loop where a transaction produces in iteration, in which the performance is measured while increasing the number of the iteration. As a result, it can be seen from FIG. 5 that an optimized version 500 to which the novel method is applied exhibits the improved performance up to four times over an original version 502 of the related art. Such an improved performance arises from the decrease of the SQL parsing overhead.

Figure 6:
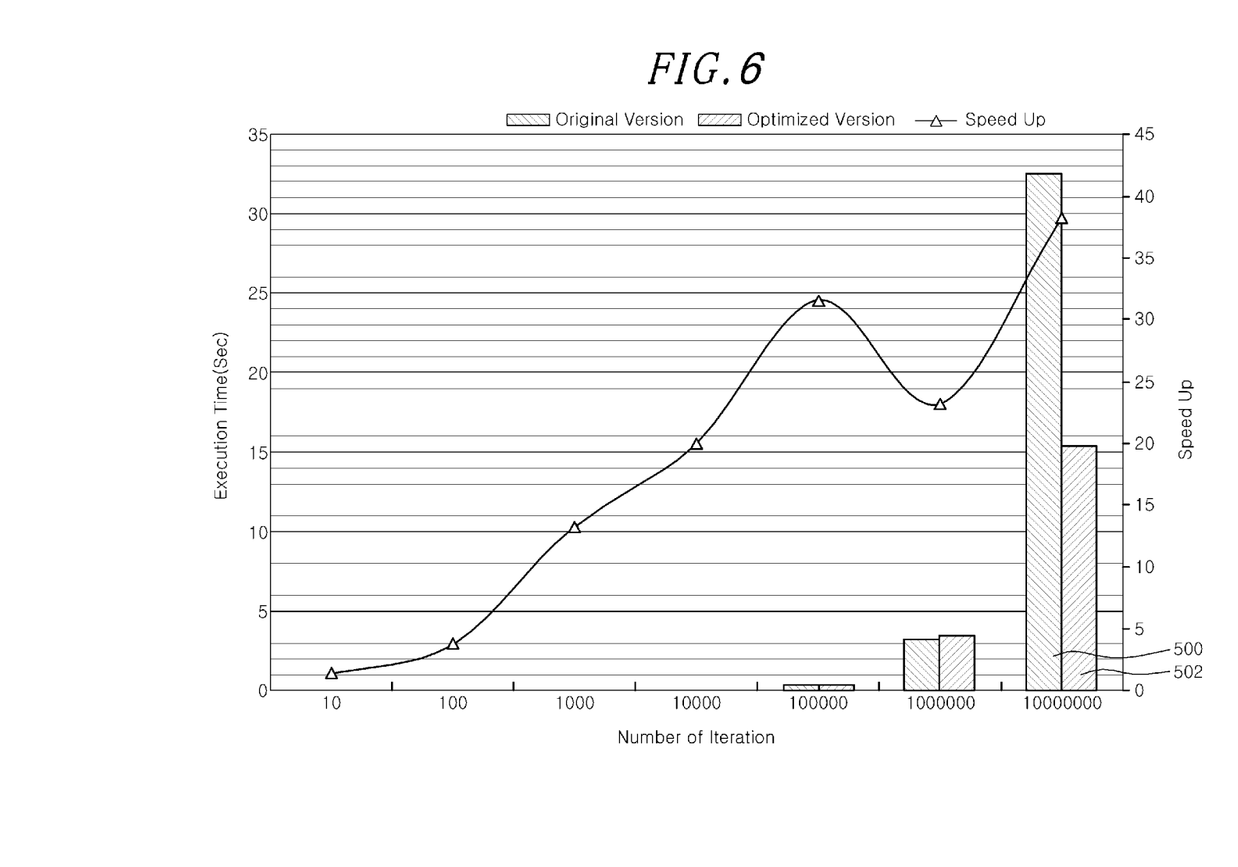
FIG. 6 is a graph exhibiting an improved maximum performance of a PSM compiler optimizer in accordance with an exemplary embodiment of the present invention.

FIG. 6 is a graph exhibiting a maximum performance improvement of the PSM compiler optimizer when a loop is performed in one transaction in accordance with an exemplary embodiment of the present invention.

As shown in FIG. 6, it is noted that the optimized version 500 to which the novel method is applied exhibits a remarkable increase in the performance as compared with the original version 502. This reason why the performance rises remarkably is that a single-DML has changed into a multi-DML in addition to the decrease in the SQL parsing overhead. Further, it can be expected to be able to bring a higher performance improvement if the table has indexes hanged thereto.

Figure 7:
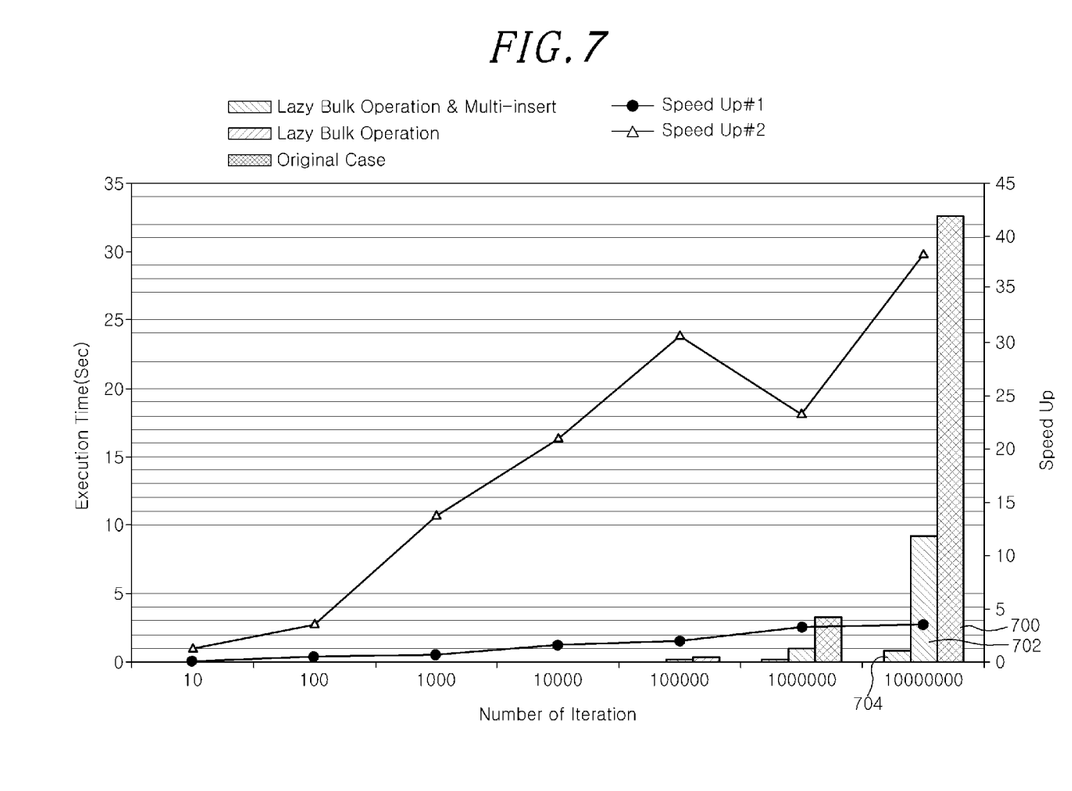
FIG. 7 is a graph exhibiting an improved performance of a PSM compiler when applying the multi-DML in accordance with an exemplary embodiment of the present invention.

FIG. 7 is a graph exhibiting a performance improvement of a PSM compiler optimizer when applying the multi-DML in accordance with an exemplary embodiment of the present invention, which shows results obtained by measuring the performance improvement in step-wise to demonstrate if the opportunity of utilizing the multi-DML can bring out any performance improvement.

It can be seen from FIG. 7 that an optimized version 702 of the exemplary embodiment results in an improved performance approximately four times over an original case 700 of the related art when applying only the bulk operation, and that an optimized version 704 of the exemplary embodiment results in an improved performance up to 35 times over the original case 700 when applying the bulk operation and the multi-DML.

As set forth above, a bulk DML processing is performed in such a manner that the pattern of the PSM program written in a PSM is analyzed to create an instruction code, which can be converted into a bulk operation, and the instruction code for the bulk operation is made in a form of an array of bind parameters to operate a bulk cursor, thereby improving the performance of the PSM program.

While the invention has been shown and described with respect to the preferred embodiments, the present invention is not limited thereto. It will be understood by those skilled in the art that various changes and modifications may be made without departing from the scope of the invention as defined in the following claims.

What is claimed is:

1. A PSM compiler optimizer comprising:
   a code generator configured to analyze the pattern of a PSM program to pick out instruction codes that will be subjected to a bulk operation from the PSM program and produce codes for the bulk operation with respect to the instruction codes that will be subjected to the bulk operation;
   a virtual machine configured to interpret the bulk operation codes to produce DMLs depending on the bulk operation;
   a query executor configured to process the DMLs produced by the virtual machine, wherein the virtual machine is configured to maintain the DMLs stored in a memory if the number of the DMLs is less than or equal to a predetermined value and forward the DMLs stored in the memory to the query executor when the number of the DMLs reaches the predetermined value; and wherein the query executor is configured to batch-process the DMLs forwarded from the virtual machine.

2. The PSM complier optimizer of claim 1, wherein when a DML statement and other statement different from the DML statement are mixed in the bulk operation codes, the virtual machine is configured to add TCL information to the bind parameters included in the other statements so that the query executor identifies that the DML statement and the other statement different from the DML statement are mixed in the bulk operation codes.

3. The PSM complier optimizer of claim 2, wherein the query executor is configured to check whether the DML statement and the other statement different from the DML statement are mixed in the bulk operation codes using the TCL information and perform a procedure adapted for the other statement different from the DML statement when the other statement is mixed with the DML statement in the bulk operation codes.

4. A method for processing a bulk DML, the method comprising:
analyzing, in a PSM optimizer, the pattern of a PSM program to pick out instruction codes that will be subjected to a bulk operation from the PSM program;
producing, in a virtual machine, bulk operation codes with respect to the instruction codes that will be subjected to the bulk operation;
interpreting, in the virtual machine, the bulk operation codes to produce DMLs depending on the bulk operation;
forwarding, in the virtual machine, the DMLs to a query executor when the number of the DMLs reaches a predetermined value; and
performing a batch-process on the DMLs forwarded from the virtual machine.

5. The method of claim 4, said forwarding the DMLs to the query executor comprises:
counting the number of the DMLs produced by the virtual machine;
storing the DMLs in a memory when the number of the DMLs is less than or equal to the predetermined value;
forwarding the DMLs stored in the memory to the query executor when the number of the DMLs reaches the predetermined value.

6. The method of claim 4, said performing the batch-process on the DMLs comprises:
checking whether a DML statement and other statement different from the DML statement are mixed in the DMLs produced by the virtual machine;
batch-processing the DMLs when there exists only the DML statements; and
performing a procedure adapted for the other statement different from the DML statement when the other statement is mixed with the DML statement.

7. The method of claim 6, said checking whether a DML statement and other statement different from the DML statement are mixed in the DMLs comprises identifying whether the TCL information exists in the DML statement to check whether the other statement is mixed with the DML statement in the DMLs.

* * * * *